US008668754B2

(12) United States Patent
Furumoto

(10) Patent No.: US 8,668,754 B2
(45) Date of Patent: Mar. 11, 2014

(54) ENGINE AIR INTAKE DEVICE AND CONSTRUCTION MACHINE INCORPORATED WITH THE SAME

(75) Inventor: Yoshiharu Furumoto, Hiroshima (JP)

(73) Assignee: Kobelco Construction Machinery Co., Ltd., Hiroshima-shi (JP)

( * ) Notice: Subject to any disclaimer, the term of this patent is extended or adjusted under 35 U.S.C. 154(b) by 230 days.

(21) Appl. No.: 13/042,597

(22) Filed: Mar. 8, 2011

(65) Prior Publication Data

US 2011/0225938 A1 Sep. 22, 2011

(30) Foreign Application Priority Data

Mar. 19, 2010 (JP) ................................ 2010-064135

(51) Int. Cl.
*B01D 46/00* (2006.01)

(52) U.S. Cl.
USPC .......... 55/350.1; 55/342; 55/385.1; 55/385.3; 55/403; 55/482; 96/189

(58) Field of Classification Search
USPC .......... 55/350.1, 385.1, 385, 393, 385.3, 403, 55/342, 482, 484, 492, 495, 486, 505, 524, 55/529; 123/198 E; 96/189
See application file for complete search history.

(56) References Cited

U.S. PATENT DOCUMENTS

| | | | | |
|---|---|---|---|---|
| 2,853,153 | A | 9/1958 | Sexton | |
| 3,934,992 | A | 1/1976 | Thompson et al. | |
| 7,531,017 | B2 * | 5/2009 | Ryan et al. | 55/385.2 |
| 2005/0235957 | A1 * | 10/2005 | Duncan | 123/429 |
| 2009/0293467 | A1 * | 12/2009 | Boeckenhoff | 60/324 |

FOREIGN PATENT DOCUMENTS

| | | | |
|---|---|---|---|
| CN | 1500989 | A | 6/2004 |
| DE | 100 32 384 | A1 | 1/2002 |
| DE | 10 2005 019 672 | A1 | 11/2006 |
| FR | 902 485 | | 8/1945 |
| FR | 1.526.460 | | 5/1968 |
| JP | 2005-248755 | | 9/2005 |
| JP | 2006-37934 | | 2/2006 |
| JP | 2007-23863 | | 2/2007 |
| JP | 2008-82324 | A | 4/2008 |

OTHER PUBLICATIONS

Extended European Search Report issued Sep. 12, 2012 in European Patent Application No. 11158402.5.

(Continued)

*Primary Examiner* — Jason M Greene
*Assistant Examiner* — Karla Hawkins
(74) *Attorney, Agent, or Firm* — Oblon, Spivak, McClelland, Maier & Neustadt, L.L.P.

(57) ABSTRACT

Two air cleaners 20A, 20B are disposed on a horizontal plane in a state that air inlets 24, 24 are directed in an upward direction and an axial directions of the air cleaners 20A, 20B are aligned in parallel to each other. An air intake duct 21 for drawing in external air is disposed to overlap the air cleaners 20A, 20B in the upward direction. The air intake duct 21 is connected to the air inlets 24, 24 of the air cleaners 20A, 20B. A merging chamber S1 for supplying airs filtered through the air cleaners 20A, 20B to an engine is disposed along a direction orthogonal to the axial directions of the air cleaners 20A, 20B. The air cleaners 20A, 20B and a merging member 22 are attached to a common attachment member 26.

10 Claims, 8 Drawing Sheets

(56) References Cited

OTHER PUBLICATIONS

Combined Chinese Office Action and Search Report issued Dec. 5, 2012 in Chinese Patent Application No. 201110074282.6 (with English Summary and English Translation of Categories of Cited Documents).

Office Action mailed Oct. 1, 2013 in Japanese Patent Application No. 2010-064135 filed Mar. 19, 2010 (With English Translation).

* cited by examiner

ENGINE AIR INTAKE DEVICE AND CONSTRUCTION MACHINE INCORPORATED WITH THE SAME

BACKGROUND OF THE INVENTION

1. Field of the Invention

The present invention relates to an engine air intake device for supplying combustion air to an engine in a construction machine such as a hydraulic shovel.

2. Description of the Background Art

The background art is described by a hydraulic shovel (hereinafter, called as a conventional hydraulic shovel) disclosed in Japanese Unexamined Patent Publication No. 2005-248755.

The conventional hydraulic shovel has an engine air intake device for supplying combustion air to an engine. The engine air intake device is provided with two independent air cleaners, and an air expanding chamber (hereinafter, called as a merging chamber) for supplying air while merging the airs drawn out through the two air cleaners.

In the following, a layout of two air cleaners and a merging chamber, which is supposed to be designed for the conventional hydraulic shovel provided with two air cleaners and a merging chamber, is described by referring to a comparative example shown in FIGS. 7 and 8.

As shown in FIG. 7, a hydraulic shovel is provided with a crawler-type lower propelling body 1, an upper slewing body 2 slewably mounted on the lower propelling body 1, and a working attachment 3 attached to the upper slewing body 2.

The upper slewing body 2 is provided with an upper frame 2*a*, a cabin 4 disposed on the left side and on the front side of the upper frame 2*a*, a guard member 13 for covering the upper frame 2*a* from above, a first partition plate 7 for defining an engine room 5 between the upper frame 2*a* and the guard member 13, a second partition plate 12A for defining an air intake chamber 8A between the upper frame 2*a* and the guard member 13, an engine 6 and relevant devices disposed in the engine room 5, and an engine air intake device 9 disposed in the air intake chamber 8A.

An air intake port 14 (see FIG. 8) for drawing in external air is formed in a side portion of the guard member 13.

The air intake chamber 8A is formed on the front side of the engine room 5, with the first partition plate 7 being interposed between the air intake chamber 8A and the engine room 5.

The second partition plate 12A is adapted to separate the space where the air intake chamber 8A is disposed from the space defined on the front side of the second partition plate 12A.

The engine air intake device 9 supplies combustion air (external air) to the engine 6. Specifically, as shown in FIG. 8, the engine air intake device 9 includes two air cleaners 10A, 10B for filtering external air, and a merging chamber (also called as a merging box or a collecting box) 11 for supplying air while merging the airs filtered through the air cleaners 10A, 10B to the engine 6.

The first air cleaner 10A, the second air cleaner 10B respectively include air inlets 15, and air outlets 16, 16. The air inlets 15, 15 are opened toward the air intake port 14. The air outlets 16, 16 are connected to the merging chamber 11 through hoses 17, 17.

In FIG. 8, the reference numeral 18 denotes a partition wall for separating the air-intake-side space where the air inlets 15, 15 of the air cleaners 10A, 10B are disposed from the other space.

In the comparative example shown in FIGS. 7 and 8, the air intake port 14 is disposed with respect to the air cleaners 10A, 10B in the same direction as the aligned direction (left and right directions) of the air cleaners 10A, 10B, and the air cleaners 10A, 10B are disposed on a common horizontal plane in a state that the air inlets 15, 15 of the air cleaners 10A, 10B are respectively directed toward the air intake port 14. Because of the above arrangement, the conventional hydraulic shovel has the following drawbacks.

(i) The air cleaners 10A, 10B are required to be disposed to be offset relative to each other in the axial directions thereof (in the lengthwise directions of the rectangular-shaped air cleaner main bodies shown in FIG. 8) so that the air inlet 15 of the air cleaner 10B disposed on the rear side (upper side in FIG. 8) when viewed from the air intake port 14 may not be blocked by the forward-side air cleaner 10A. As a result, the planar space to be occupied by the air cleaners 10A, 10B when viewed from above is required to be increased in the axial directions thereof.

(ii) The partition wall 18 is formed between the air cleaners 10A, 10B. Accordingly, the interval between the air cleaners 10A, 10B is required to be increased, which results in an increase in the space to be occupied by the air cleaners 10A, 10B in a direction (left and right directions) orthogonal to the axial directions of the air cleaners 10A, 10B.

Because of the above two points, the space to be occupied by the air cleaners 10A, 10B is increased when the entirety of the engine air intake device 9 is viewed from above, and the air intake chamber 8A is required to be increased by the increased space for disposing the air cleaners 10A, 10B. As a result, the disposition of the devices to be installed in the air-intake-side space other than the air intake chamber 8A is restricted, and miniaturization of a construction machine cannot be sufficiently achieved.

Further, since the air cleaners 10A, 10B are disposed to be offset relative to each other, the distance from the air cleaner 10A to the merging chamber 11 is unduly increased, and the air cleaner 10A and the merging chamber 11 are required to be connected to each other by a hose 17 of a longer length, which makes the connecting operation cumbersome.

SUMMARY OF THE INVENTION

An object of the invention is to provide an engine air intake device that enables to reduce the space to be occupied by the engine air intake device when the entirety of the engine air intake device is viewed from above, and to shorten the distance from the respective air cleaners to a merging chamber; and a construction machine incorporated with the engine air intake device.

An aspect of the invention is to provide an engine air intake device for use in a construction machine for supplying air to an engine. The air intake device includes a plurality of air cleaners each including an air inlet for drawing in air, a cleaner main body for filtering the drawn-in air through the air inlet, and an air outlet for drawing out the air filtered through the cleaner main body; a merging chamber connected to the air outlets of the air cleaners, and for merging the airs drawn out through the air outlets of the air cleaners to supply the merged air to the engine; and an air intake duct connected to the air inlets of the air cleaners and for drawing in external air. In this arrangement, the air cleaners are disposed on a horizontal plane in a state that the air inlets of the air cleaners are directed in a same direction as each other out of an upward direction and a downward direction, and that axial directions of the air cleaners are aligned in parallel to each other. The air intake duct is disposed to overlap the air cleaners in the upward direction or the downward direction, in which the air inlets of the air cleaners are directed. The merging chamber is disposed along a direction orthogonal to the axial directions.

Another aspect of the invention is to provide a construction machine including the engine air intake device having the above arrangement, and an engine for receiving air to be supplied from the engine air intake device.

These and other objects, features and advantages of the present invention will become more apparent upon reading the following detailed description along with the accompanying drawings.

DETAILED DESCRIPTION OF THE PREFERRED EMBODIMENTS OF THE INVENTION

Figure 1:
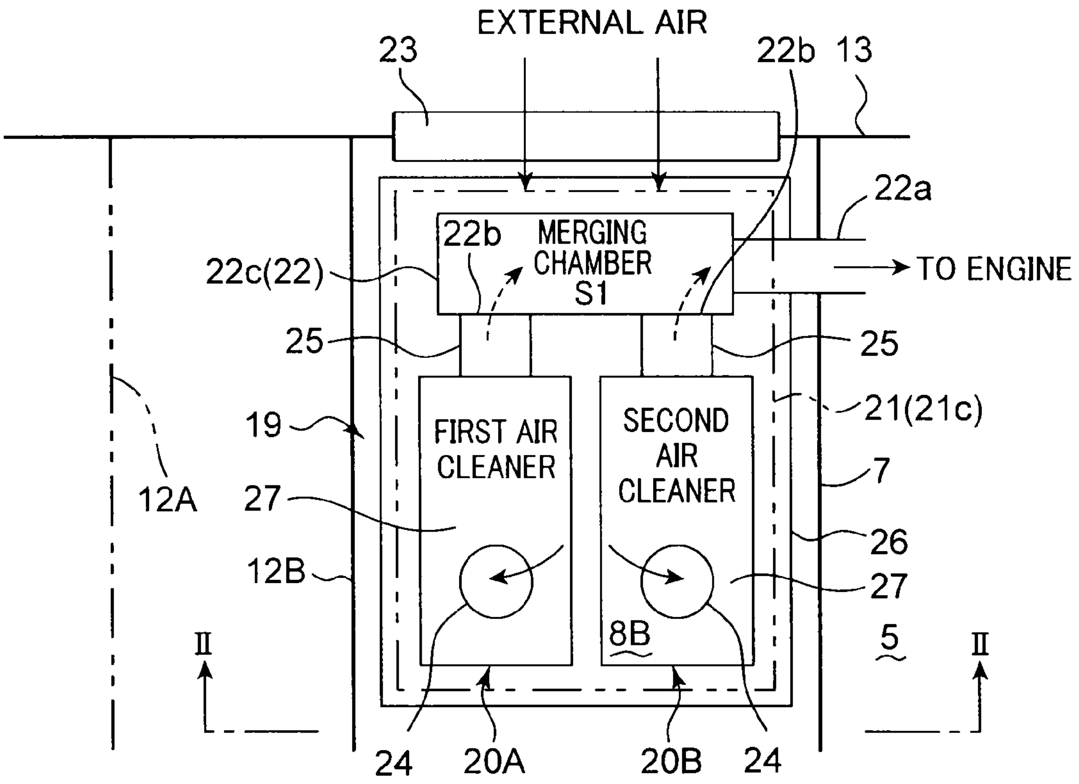
FIG. 1 is a top plan view showing disposition of air cleaners, an air intake duct and a merging chamber of an engine air intake device embodying the invention.

In the following, embodiments of the invention are described referring to the drawings. The following embodiments are merely examples embodying the invention, and do not limit the technical scope of the invention.

Figure 7:
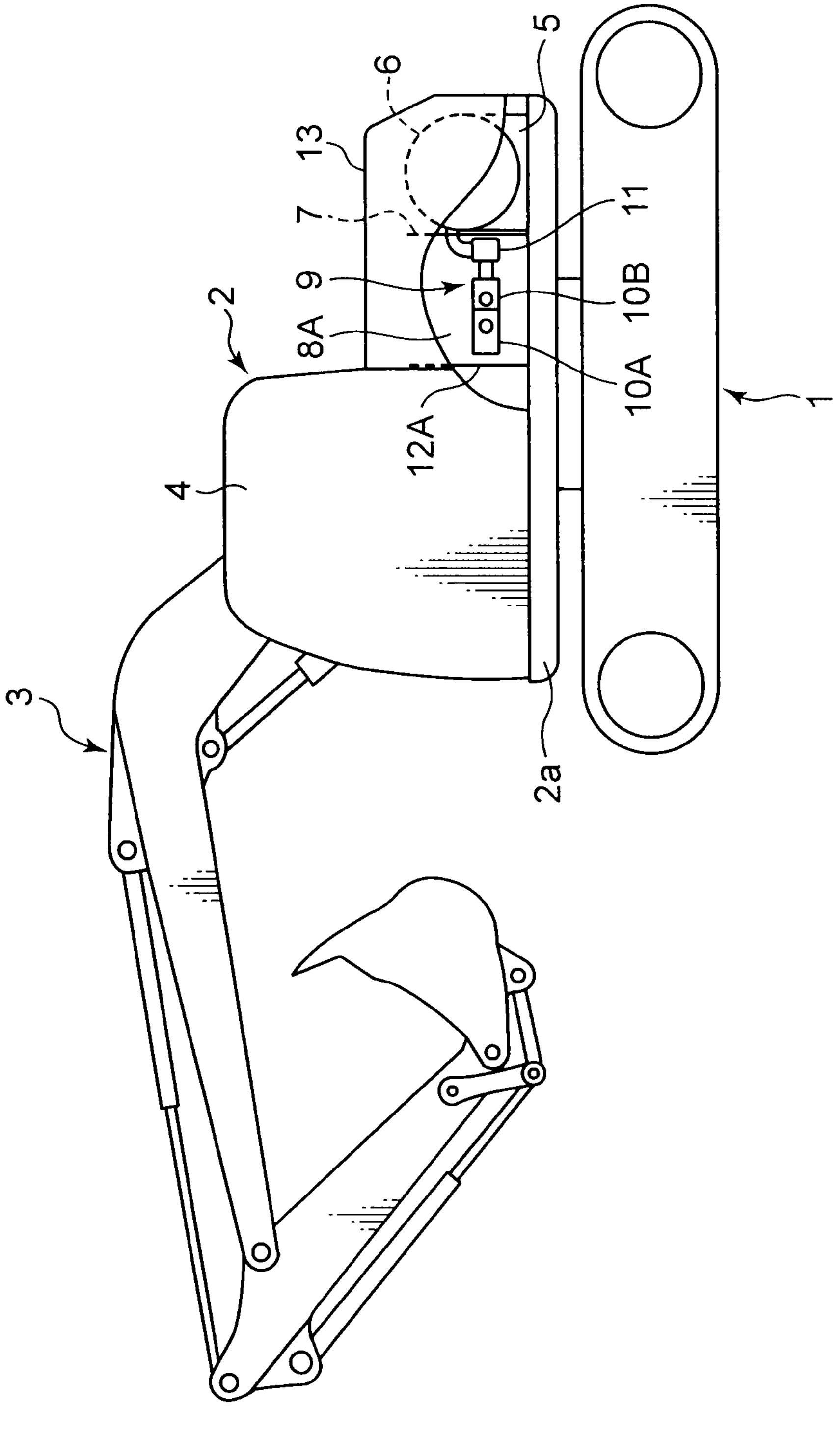
FIG. 7 is a partially cutaway side view of a hydraulic shovel, specifically showing a comparative example of an engine air intake device which is supposed to be designed for a conventional hydraulic shovel.
Figure 8:
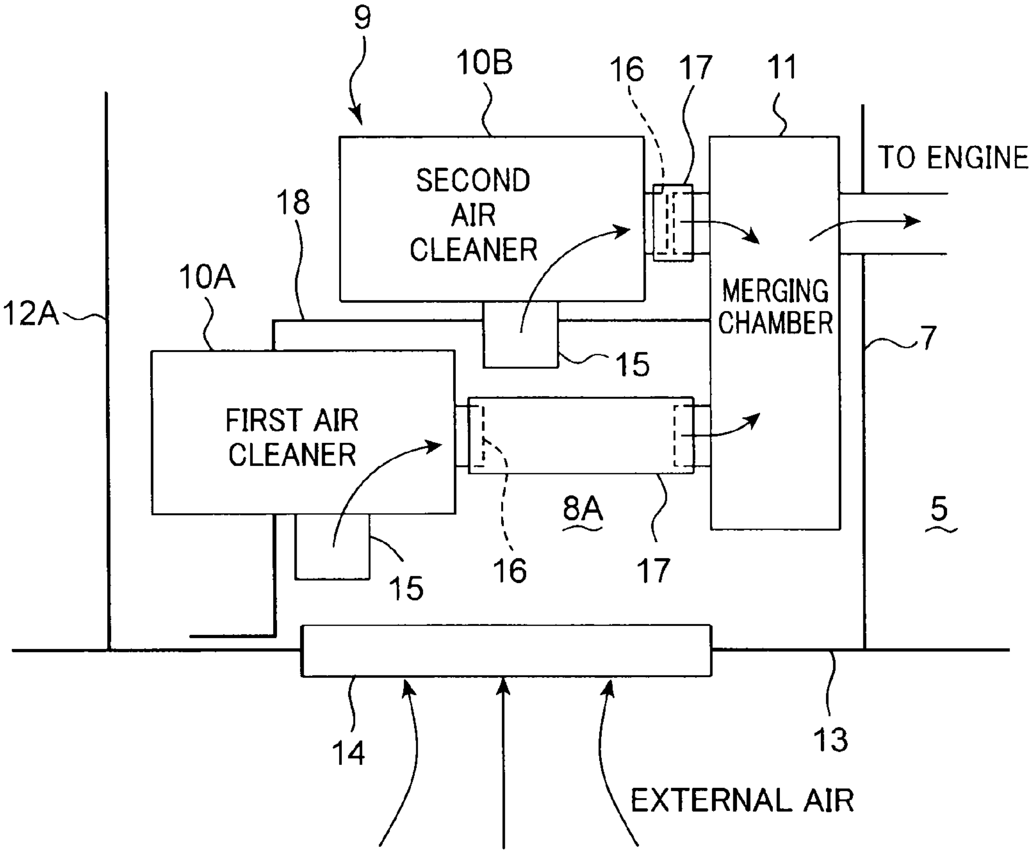
FIG. 8 is a top plan view showing the comparative example of the engine air intake device which is supposed to be designed for the conventional hydraulic shovel, specifically showing disposition of air cleaners and a merging chamber.

The basic arrangement of a hydraulic shovel as an example of a construction machine embodying the present invention is the same as the hydraulic shovel shown in FIGS. 7 and 8.

First Embodiment

Specifically, the hydraulic shovel is provided with a crawler-type lower propelling body 1, an upper slewing body 2 slewably mounted on the lower propelling body 1, and a working attachment 3 attached to the upper slewing body 2.

The upper slewing body 2 is provided with an upper frame 2*a*, a cabin 4 disposed on the left side and on the front side of the upper frame 2*a*, a guard member 13 for covering the upper frame 2*a* from above, a first partition plate 7 for defining an engine room 5 on a rear side of the cabin 4 and between the upper frame 2*a* and the guard member 13, and an engine 6 and relevant devices disposed in the engine room 5.

The hydraulic shovel in accordance with the embodiment of the invention is different from the conventional hydraulic shovel shown in FIGS. 7 and 8 in the following points.

The upper slewing body 2 includes a second partition plate 12B disposed on a rear side than the second partition plate 12A shown in FIG. 8, and an engine air intake device 19 disposed in an air intake chamber 8B which is defined between the upper frame 2*a* and the guard member 13 by the second partition plate 12B. The air intake chamber 8B is formed on the front side of the engine room 5, with the first partition plate 7 being interposed between the air intake chamber 8B and the engine room 5. Further, since the second partition plate 12B is disposed on a rear side than the second partition plate 12A, the space of the air intake chamber 8B in the embodiment is smaller than the space of the air intake chamber 8A shown in FIG. 8.

Referring to the FIGS. 1 through 4, the engine air intake device 19 supplies combustion air (external air) to the engine 6. Specifically, the engine air intake device 19 includes a first air cleaner 20A and a second air cleaner 20B for filtering external air, an air intake duct (shown by the two-dotted chain line in FIG. 1) 21 for drawing in external air to the air cleaners 20A, 20B, a merging member 22 for supplying air to the engine while merging the airs filtered through the air cleaners 20A, 20B, and an attachment member 26 operable to attach the air cleaners 20A, 20B and the merging member 22 thereon.

The first air cleaner 20A and the second air cleaner 20B have the same construction as each other. Specifically, each of the air cleaners 20A, 20B has an air inlet 24 for drawing in air, a cleaner main body 27 for filtering the drawn-in air through the air inlet 24, and an air outlet 25 for drawing out the air filtered through the cleaner main body 27. The air inlet 24 protrudes from one (the left end in FIG. 1) of both ends of the cleaner main body 27 in the lengthwise direction (hereinafter, called as the axial direction) of the cleaner main body 27 in a direction (upward direction in FIG. 1) orthogonal to the axial direction. The air outlet 25 protrudes in the axial direction (rightward direction in FIG. 1) from an end surface (the right end surface in FIG. 1) of the cleaner main body 27 opposite to the air inlet 24 in the axial direction. The air cleaners 20A, 20B are disposed on a common horizontal plane in a state that the axial directions thereof are aligned in parallel to each other. More specifically, axial ends of the cleaner main bodies 27, 27 of the air cleaners 20A, 20B are disposed at the same positions as each other in the axial directions. Further, the air inlets 24, 24 and the air outlets 25, 25 of the air cleaners 20A, 20B are disposed at the same positions as each other in the axial directions.

The air intake duct 21 includes an air intake inlet 21*a* for drawing in external air, air intake outlets 21*b*, 21*b* to be respectively connected to the air inlets 24, 24 of the air cleaners 20A, 20B, and a duct main body 21*c* for guiding the external air from the air intake inlet 21*a* to the air intake outlets 21*b*, 21*b*. The duct main body 21*c* is a tubular member having a flat parallelepiped shape. The air intake inlet 21*a* and the air intake outlets 21*b*, 21*b* are each an opening portion formed in the duct main body 21*c*. The air intake inlet 21*a* and the air intake outlets 21*b*, 21*b* are disposed at different positions from each other in plan view. Specifically, the air intake inlet 21*a* is an opening portion formed in a position corresponding to a lengthwise end surface of the parallelepiped-shaped duct main body 21*c*. On the other hand, the air intake outlets 21*b*, 21*b* each is an opening portion formed in a side surface of the parallelepiped-shaped duct main body 21*c* having a largest area.

The air intake duct 21 is disposed to overlap the air cleaners 20A, 20B in the upward direction, in which the air inlets 24, 24 of the air cleaners 20A, 20B are directed. Specifically, the air intake duct 21 overlaps the air cleaners 20A, 20B from above in a state that the air intake outlets 21*b*, 21*b* of the air intake duct 21 are directed downward, and the air intake inlet 21*a* is directed rightward. In this state, the air intake outlets 21*b*, 21*b* are respectively connected to the air inlets 24, 24 of the air cleaners 20A, 20B. On the other hand, the air intake inlet 21*a* is disposed to be directed toward an air intake port 23 (see FIG. 1) formed in a right surface of the guard member 13. In the example of FIG. 1, the air intake port 23 is formed on the opposite side of the air intake port 14 shown in FIG. 8 in the left and right directions.

Further, in this embodiment, the air intake duct 21 is disposed with respect to the air cleaners 20A, 20B in such a manner that the lengthwise direction of the duct main body 21*c* is aligned in parallel to the axial directions of the air cleaners 20A, 20B.

The merging member 22 merges the airs drawn out through the air outlets 25, 25 of the air cleaners 20A, 20B to supply the merged air to the engine 6. Specifically, the merging member 22 includes two entrance inlets 22*b*, 22*b* respectively connected to the air outlets 25, 25 of the air cleaners 20A, 20B; a merging member main body 22*c* internally formed with a merging chamber S1 (see FIG. 1) for merging the drawn-in airs through the entrance inlets 22*b*, 22*b*; and an air supply port 22*a* communicating with the merging chamber S1 and connectable to an air intake system of the engine 6. The merging member main body 22*c* is a parallelepiped-shaped box internally formed with the merging chamber S1. The entrance inlets 22*b*, 22*b* each is an opening portion formed in a side surface of the merging member main body 22*c* which faces to a direction orthogonal to the lengthwise direction of the merging member main body 22*c*. The air supply port 22*a* protrudes from a lengthwise end surface of the merging member main body 22*c* in the lengthwise direction thereof.

The merging member 22 is disposed along a direction orthogonal to the axial directions of the air cleaners 20A, 20B. Specifically, the merging member main body 22*c* is disposed on the same horizontal plane as the cleaner main bodies 27, 27 of the air cleaners 20A, 20B in a state that the lengthwise direction of the merging member main body 22*c* is aligned in a direction orthogonal to the axial directions of the air cleaners 20A, 20B (namely, a state that the lengthwise direction of the merging member main body 22*c* is aligned with the front and rear directions). Further, the merging member main body 22*c* is disposed on the opposite side (right side) of the cleaner main bodies 27, 27 with respect to the air outlets 25, 25 of the air cleaners 20A, 20B. In the above disposition state, the air outlets 25, 25 of the air cleaners 20A, 20B are respectively connected to the entrance inlets 22*b*, 22*b* of the merging member 22, and the air supply port 22*a* is connected to the air intake system of the engine 6.

In the above arrangement, the air cleaners 20A, 20B and the merging chamber S1 (merging member main body 22*c*) are disposed in a planar space to be occupied by the air intake duct 21. In other words, the air intake duct 21 is disposed to overlap the entirety of the air cleaners 20A, 20B and the merging chamber S1 (merging member main body 22*c*) from above.

Figure 3:
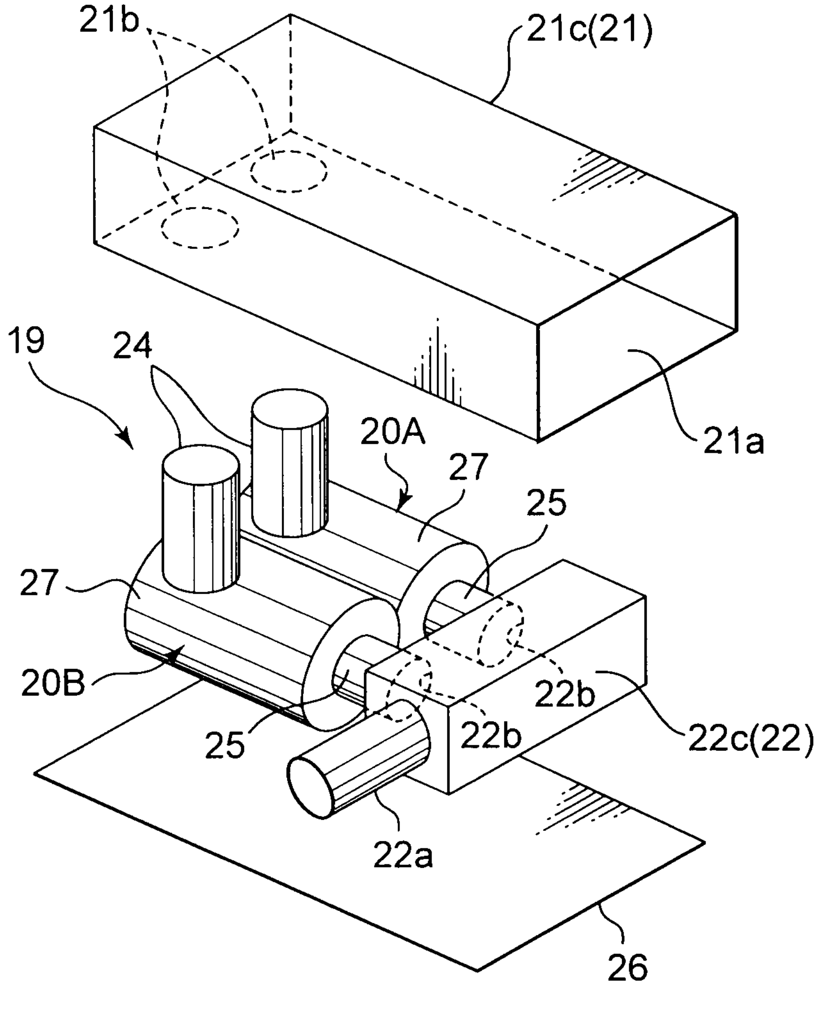
FIG. 3 is a perspective view showing a state before the engine air intake device shown in FIG. 1 is assembled.
Figure 4:
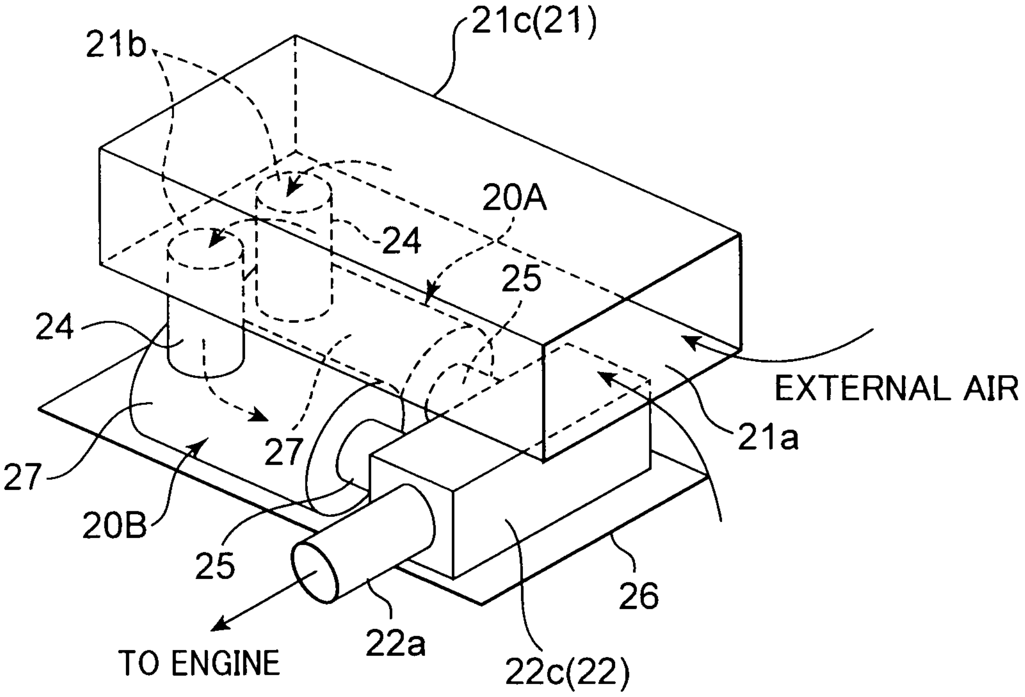
FIG. 4 is a perspective view showing a state that the engine air intake device shown in FIG. 1 is assembled.

The attachment member 26 has a top surface thereof for attaching the air cleaners 20A, 20B and the merging member 22 thereon. In FIGS. 3 and 4, the attachment member 26 is shown as a rectangular plate to simplify the description. Alternatively, however, the attachment member 26 may be provided with a structure such as a bracket or a support block for attaching the air cleaners 20A, 20B and the merging member 22 thereon. Further alternatively, the shape of the attachment member 26 is not limited to a rectangular shape, and any shape may be selected in association with the structures in the vicinity of the attachment member 26.

In the engine air intake device 19, the air inlets 24, 24 of the air cleaners 20A, 20B are opened upward, and the air intake duct 21 is disposed to overlap the air cleaners 20A, 20B in upward direction, in which the air inlets 24, 24 of the air cleaners 20A, 20B are directed. With this arrangement, it is possible to draw air into the air cleaners 20A, 20B through the air intake duct 21, without offsetting the air cleaners 20A, 20B relative to each other in the axial directions thereof.

Specifically, as described above, it is possible to dispose the both axial ends of the cleaner main bodies 27, 27 of the air cleaners 20A, 20B at the same positions as each other in the axial directions, and to dispose the air inlets 24, 24 and the air outlets 25, 25 of the air cleaners 20A, 20B at the same positions as each other in the axial directions. In other words, it is possible to dispose the air cleaners 20A, 20B without offset.

With the above arrangement, it is possible to reduce the planar space to be occupied by the air cleaners 20A, 20B.

Further, in the engine air intake device 19, it is possible to draw external air into the air cleaners 20A, 20B through the air intake duct 21. With this arrangement, there is no need of providing a partition wall (the partition wall 18 shown in FIG. 8) for separating the space where the air inlets 24, 24 of the air cleaners 20A, 20B are disposed from the other space. Thus, it is possible to eliminate the interval between the air cleaners 20A, 20B, which has been required for providing the partition wall.

Further, since the air intake duct 21 is disposed to overlap the air cleaners 20A, 20B from above, the planar space when viewed from above can be shared by the air intake duct 21 and the air cleaners 20A, 20B.

With the above features, it is possible to reduce the space to be occupied by the engine air intake device 19 when the entirety of the engine air intake device 19 is viewed from above, as compared with the conventional art.

Figure 2:
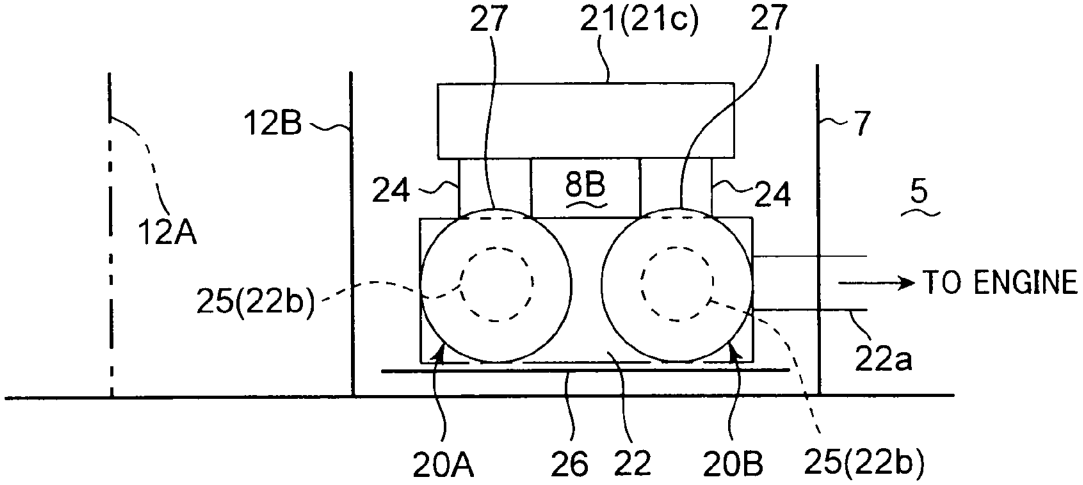
FIG. 2 is a cross-sectional view taken along the line II-II in FIG. 1.

In FIGS. 1 and 2, the second partition plate 12A of the comparative example shown in FIG. 8 is indicated by the two-dotted chain line, and the second partition plate 12B of the embodiment is indicated by the solid line. With the engine air intake device 19 of the embodiment, it is possible to reduce a space between the second partition plate 12A and the first partition plate 7, as compared with a space between the second partition plate 12B and the first partition plate 7.

Further, in this embodiment, the air intake inlet 21*a* and the air intake outlets 21*b*, 21*b* of the air intake duct 21 are disposed at different positions from each other in plan view. Accordingly, even in the case where the air intake inlet 21*a* is opened upward, the passage of raindrops which have intruded through the air intake inlet 21*a* is blocked by the duct main body 21*c*. Thus, it is possible to suppress intrusion of raindrops into the air cleaners 20A, 20B.

Furthermore, in this embodiment, it is possible to reduce the offset amount of the respective air cleaners 20A, 20B in the axial direction to thereby shorten the distance from the respective air cleaners 20A, 20B to the merging chamber S1. Furthermore, in this embodiment, it is possible to set the distance from the air cleaner 20A to the merging chamber S1 equal to the distance from the air cleaner 20B to the merging chamber S1 by setting the offset amount of the respective air cleaners 20A, 20B to zero, and by disposing the merging chamber S1 along the direction orthogonal to the axial directions of the air cleaners 20A, 20B. With this arrangement, it is possible to simplify the operation of connecting between the respective air cleaners 20A, 20B and the merging chamber S1 (merging member 22).

In this embodiment, the engine air intake device is provided with the attachment member 26 operable to attach the air cleaners 20A, 20B and the merging member 22 thereon. With this arrangement, it is possible to perform so-called sub-assembling of incorporating the air cleaners 20A, 20B and the merging member 22 into a working machine in a state that the air cleaners 20A, 20B and the merging member 22 are attached to the common attachment member 26, or in a state shown in FIG. 4 that the air intake duct 21 is connected to the air cleaners 20A, 20B in addition to the attachment. Thus, the operation of assembling the engine air intake device 19, and the operation of incorporating the engine air intake device 19 into the working machine can be facilitated.

In this embodiment, the air cleaners 20A, 20B and the merging chamber S1 are disposed in a planar space to be occupied by the air intake duct 21. Accordingly, it is possible to effectively reduce the space to be occupied by the engine air intake device 19 when the entirety of the engine air intake device 19 is viewed from above.

In this embodiment, the axial ends of the cleaner main bodies 27, 27 of the air cleaners 20A, 20B are disposed at the same positions as each other in the axial directions, and the air inlets 24, 24 and the air outlets 25, 25 of the air cleaners 20A, 20B are disposed at the same positions as each other in the axial directions. With the above arrangement, the offset amount of the respective air cleaners 20A and 20B in the axial direction is set to zero. Thus, it is possible to effectively reduce the space to be occupied by the engine air intake device 19 when the entirety of engine air intake device 19 is viewed from above, and to effectively reduce the distance from the respective air cleaners 20A, 20B to the merging chamber S1. Further, it is possible to easily adjust the position of the respective air cleaners 20A, 20B in connecting between the respective air cleaners 20A, 20B and the air intake duct 21 and connecting between the respective air cleaners 20A, 20B and the merging chamber S1.

In this embodiment, the air outlets 25, 25 of the air cleaners 20A, 20B extend from the axial ends of the air cleaners 20A, 20B in the axial directions, and the merging chamber S1 is disposed on the same horizontal plane as the cleaner main bodies 27, 27. Accordingly, it is also possible to reduce the space to be occupied by the air cleaners 20A, 20B and the merging chamber S1 in a vertical direction.

Second Embodiment

Figure 5:
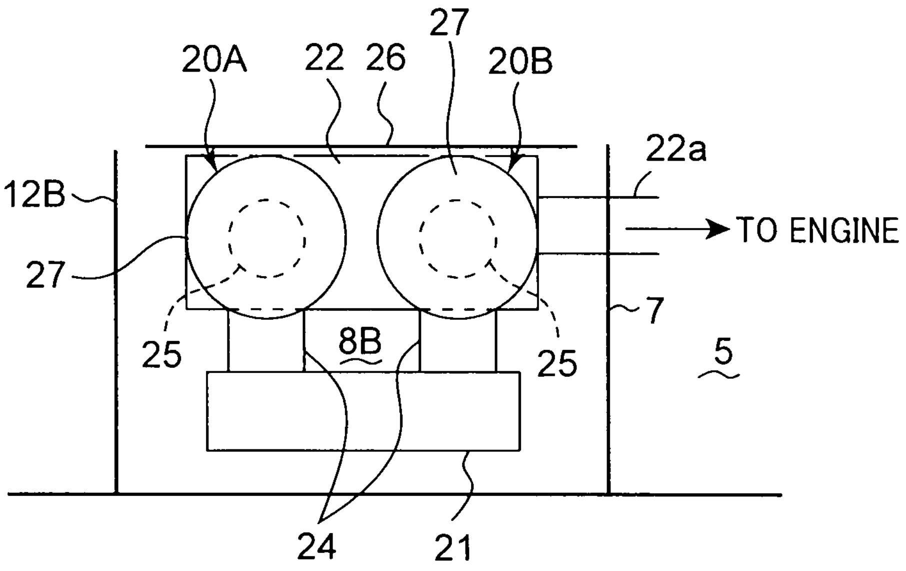
FIG. 5 is a diagram corresponding to FIG. 2 and shows an engine air intake device as another embodiment of the invention.
Figure 6:
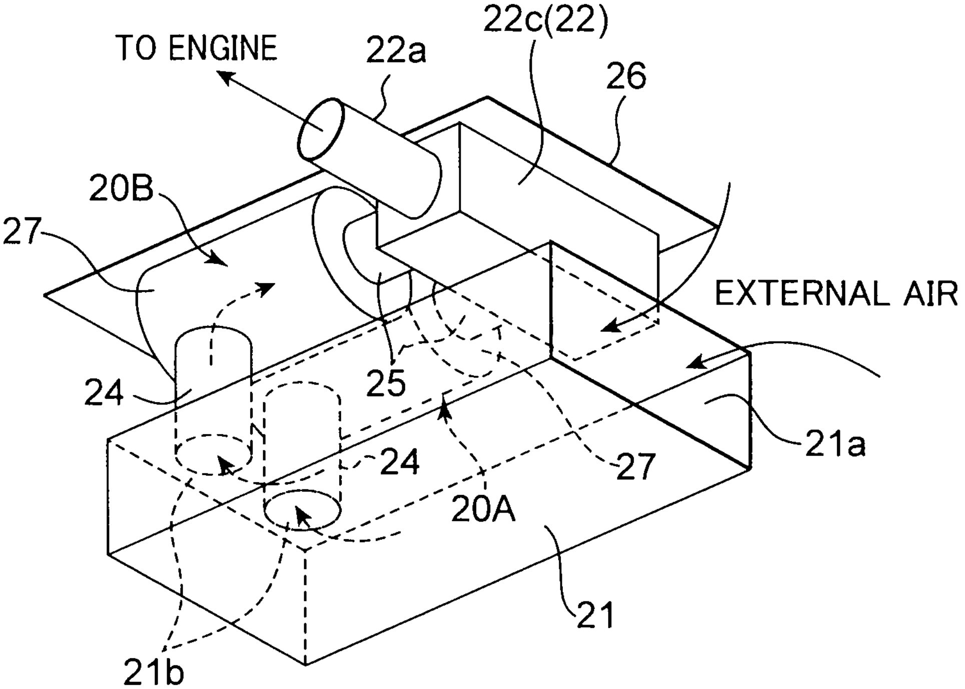
FIG. 6 is a perspective view of the engine air intake device shown in FIG. 5.

The second embodiment of the present invention is described referring to FIGS. 5 and 6.

The second embodiment is different from the first embodiment in that the direction of placing the air cleaners 20A, 20B, the merging member 22, the air intake duct 21, and the attachment member 26 is opposite to the first embodiment. Specifically, in this embodiment, the air inlets 24, 24 of the air cleaners 20A, 20B are directed in the downward direction, and the air intake duct 21 is disposed to overlap the air cleaners 20A, 20B in the downward direction. The merging member 22 is disposed on the opposite side of the cleaner main bodies 27, 27 with respect to the air inlets 25, 25. The attachment member 26 is disposed on the air cleaners 20A, 20B and the merging member 22. In other words, the air cleaners 20A, 20B and the merging member 22 are attached to the bottom surface of the attachment member 26.

In the first and the second embodiments, the air cleaners 20A, 20B are disposed at the same positions as each other in the axial directions, in other words, the air cleaners 20A, 20B are not offset relative to each other in the axial directions. Alternatively, the air cleaners 20A, 20B may be slightly offset relative to each other in the axial directions depending on an ambient environment.

In the first and the second embodiments, the air cleaners 20A, 20B and the merging chamber S1 (merging member main body 22*c*) are disposed on a common horizontal plane. Alternatively, for instance, the air outlets 25, 25 of the air cleaners 20A, 20B may be directed in the upward direction or the downward direction, and the merging chamber S1 (merging member main body 22*c*) may be disposed to overlap the air cleaners 20A, 20B in the upward direction or the downward direction.

In the first and the second embodiments, the engine air intake device 19 is provided with the two air cleaners 20A, 20B. Alternatively, the engine air intake device may be provided with three or more air cleaners.

In the first and the second embodiments, a hydraulic shovel is described as an example of a construction machine. Alternatively, for instance, the engine air intake device may be applied to the other construction machine (such as a crusher or a demolition machine) basically having the same construction as the hydraulic shovel.

The embodiments as described above mainly include the invention having the following features.

An aspect of the present invention is directed to an engine air intake device for use in a construction machine for supplying air to an engine. The engine air intake device includes a plurality of air cleaners each including an air inlet for drawing in air, a cleaner main body for filtering the drawn-in air through the air inlet, and an air outlet for drawing out the air filtered through the cleaner main body; a merging chamber connected to the air outlets of the air cleaners, and for merging the airs drawn out through the air outlets of the air cleaners to supply the merged air to the engine; and an air intake duct connected to the air inlets of the air cleaners and for drawing in external air. In this arrangement, the air cleaners are disposed on a horizontal plane in a state that the air inlets of the air cleaners are directed in a same direction as each other out of an upward direction and a downward direction, and that axial directions of the air cleaners are aligned in parallel to each other. The air intake duct is disposed to overlap the air cleaners in the upward direction or the downward direction, in which the air inlets of the air cleaners are directed. The merging chamber is disposed along a direction orthogonal to the axial directions.

In the above arrangement, the air inlets of the air cleaners are opened upward or downward, and the air intake duct is placed above or below the air cleaners in accordance with the direction in which the air inlets of the air cleaners are directed. Accordingly, it is possible to guide the air to the air cleaners through the air intake duct, without offsetting the air cleaners relative to each other in the axial directions thereof. Thus, it is possible to reduce the offset amount of the respective air cleaners to thereby reduce the planar space to be occupied by the air cleaners.

Further, in the above arrangement, it is possible to draw in external air into the air cleaners through the air intake duct. Thus, there is no need of disposing a partition wall (the partition wall 18 shown in FIG. 8) for separating the space where the air inlets of the air cleaners are disposed from the other space. Accordingly, it is possible to eliminate the interval between the air cleaners for providing the partition wall.

Furthermore, since the air intake duct is placed above or below the air cleaners, a planar space to be occupied by the air intake duct when the entirety of the engine intake device is viewed from above can be shared by the air cleaners.

With the above features, it is possible to reduce the space to be occupied by the engine intake device when the entirety of the engine intake device is viewed from above.

In addition, as described above, it is possible to reduce the offset amount of the respective air cleaners in the axial direction to thereby reduce the distance from the respective air cleaners to the merging chamber. Thus, it is possible to simplify the operation of connecting between the respective air cleaners and the merging chamber.

In the present invention, “the axial direction of the air cleaner” indicates the lengthwise direction of the cleaner main body.

In the engine air intake device, preferably, the air intake duct may include an air intake inlet for drawing in external air, a plurality of air intake outlets to be respectively connected to the air inlets of the air cleaners, and a duct main body for guiding the external air from the air intake inlet to the air intake outlets, and the air intake inlet and the air intake outlets may be disposed at different positions from each other in plan view.

In the above arrangement, the air intake inlet and the air intake outlets of the air intake duct are disposed at different positions from each other in plan view. Accordingly, even in the case where the air intake inlet is opened upward, it is possible to suppress intrusion of raindrops into the air cleaners, because the passage of raindrops which have intruded through the air intake inlet is blocked by a wall surface of the duct main body.

Specifically, in the case where the air inlets of the air cleaners are opened upward, and an air intake port is formed in the top surface of an air intake chamber, a serious drawback i.e. intrusion of raindrops into the air cleaners may occur, although there is no need of offsetting the air cleaners relative to each other in the axial directions thereof. On the other hand, in the above arrangement, it is possible to suppress raindrops which have intruded through an air intake inlet from reaching an air intake outlet.

Preferably, the engine air intake device may further include a merging member. The merging member has a plurality of entrance inlets to be respectively connected to the air outlets of the air cleaners; a merging member main body internally formed with the merging chamber for merging the drawn-in airs through the entrance inlets; and an air supply port communicating with the merging chamber and connectable to an air intake system of the engine, wherein the merging member is disposed in such a direction that a lengthwise direction of the merging member main body is aligned in a direction orthogonal to the axial directions.

In the above arrangement, the merging member main body is disposed along the aligned direction (the direction orthogonal to the axial directions) of the air cleaners. Accordingly, it is possible to dispose the merging member by effectively utilizing the space for aligning the air cleaners, while keeping the distances between the respective air cleaners and the merging member relatively equal to each other.

Preferably, the engine air intake device may further include a common attachment member operable to attach the air cleaners and the merging member thereon.

In the above arrangement, the engine air intake device is provided with the attachment member operable to attach the air cleaners and the merging member thereon. Accordingly, it is possible to perform so-called sub-assembling of incorporating the air cleaners and the merging member into a working machine in a state that the air cleaners and the merging member are attached to the common attachment member, or in a state that the air intake duct is connected to the air cleaners in addition to the attachment. Thus, the operation of assembling the engine air intake device, and the operation of incorporating the engine air intake device into the working machine can be facilitated.

In the engine air intake device, preferably, the air cleaners and the merging chamber may be disposed in a planar space to be occupied by the air intake duct.

In the above arrangement, the air cleaners and the merging chamber are disposed in the planar space to be occupied by the air intake duct. Accordingly, it is possible to effectively reduce the space to be occupied by the engine air intake device when the entirety of the engine air intake device is viewed from above.

In the engine air intake device, preferably, both axial ends of the cleaner main bodies of the air cleaners may be disposed at same positions as each other in the axial directions, and the air inlets and the air outlets of the air cleaners may be disposed at same positions as each other in the axial directions.

In the above arrangement, the offset amount of the respective air cleaners in the axial direction is set to zero. Accordingly, it is possible to effectively reduce the space to be occupied by the engine air intake device when the entirety of engine air intake device is viewed from above, and to effectively reduce the distance from the respective air cleaners to the merging chamber. Further, it is possible to easily adjust the position of the respective air cleaners in connecting between the respective air cleaners to the air intake duct and connecting between the respective air cleaners to the merging chamber.

In the engine air intake device, preferably, the air outlet of each of the air cleaners may extend from one axial end of the cleaner main body in the axial direction, and the merging chamber may be disposed on the same horizontal plane as the cleaner main bodies.

In the above arrangement, the air outlet of each of the air cleaners extends from one axial end of the cleaner main body in the axial direction, and the merging chamber is disposed on the same horizontal plane as the cleaner main bodies. Accordingly, it is also possible to reduce the space to be occupied by the air cleaners and the merging chamber in a vertical direction.

Another aspect of the present invention is to provide a construction machine including the engine air intake device having any one of the above arrangements, and an engine for receiving air to be supplied from the engine air intake device.

This application is based on Japanese Patent Application No. 2010-064135 filed on Mar. 19, 2010, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. An engine air intake device for use in a construction machine for supplying air to an engine, the air intake device comprising:

a plurality of air cleaners, each air cleaner including an air inlet for drawing in air, a cleaner main body for filtering the drawn-in air through the air inlet, and an air outlet for drawing out the air filtered through the cleaner main body;

a merging chamber connected to the air outlets of the air cleaners, the merging chamber merging the air drawn out through the air outlets of the air cleaners to supply the merged air to the engine; and an air intake duct having a duct main body connected to the air inlets of the air cleaners, the air intake duct drawing in external air, wherein the air cleaners are disposed on a horizontal plane such that the air inlets of the air cleaners are directed in a same direction as each other out of an upward direction and a downward direction, and the air cleaners are further disposed such that axial directions of the air cleaners are aligned in parallel to each other and parallel to the horizontal plane, wherein the air intake duct is disposed above the air inlets of the air cleaners which are directed in the upward direction to overlap the air cleaners from above, or below the air inlets of the air cleaners which are directed in the downward direction to overlap the air cleaners from below, wherein the merging chamber is disposed to longitudinally extend along a direction orthogonal to the axial directions, and wherein the air intake duct is disposed with respect to the air cleaners in such a manner that a lengthwise direction of the duct main body is aligned in parallel to the axial directions of the air cleaners.

2. The engine air intake device according to claim 1, wherein the air intake duct includes an air intake inlet for drawing in external air, a plurality of air intake outlets to be respectively connected to the air inlets of the air cleaners, and the duct main body for guiding the external air from the air intake inlet to the air intake outlets, and the air intake inlet and the air intake outlets are disposed at different positions from each other in plan view.

3. The engine air intake device according to claim 1, further comprising a merging member including:

a plurality of entrance inlets respectively connected to the air outlets of the air cleaners;

a merging member main body internally formed with the merging chamber for merging the drawn-in air through the entrance inlets; and an air supply port communicating with the merging chamber and connectable to an air intake system of the engine, wherein the merging member is disposed in such a direction that a lengthwise direction of the merging member main body is aligned in a direction orthogonal to the axial directions.

4. The engine air intake device according to claim 3, further comprising an attachment member to attach the air cleaners and the merging member thereon.

5. The engine air intake device according to claim 1, wherein the air cleaners and the merging chamber are disposed in a planar space occupied by the air intake duct.

6. The engine air intake device according to claim 1, wherein both axial ends of the respective cleaner main bodies of the air cleaners are disposed at same positions as each other in the axial directions, and the air inlets and the air outlets of the respective air cleaners are disposed at same positions as each other in the axial directions.

7. The engine air intake device according to claim 1, wherein the air outlet of each of the air cleaners extends from one axial end of the respective cleaner main body in the axial direction, and the merging chamber is disposed on the same horizontal plane as the cleaner main bodies.

8. A construction machine, comprising:

an engine air intake device of claim 1; and an engine for receiving air supplied from the engine air intake device.

9. The engine air intake device according to claim 1, wherein the air intake duct includes an air intake inlet for drawing in external air, a plurality of air intake outlets to be respectively connected to the air inlets of the air cleaners, and the duct main body for guiding the external air from the air intake inlet to the air intake outlets, the air intake inlet and the air intake outlets are disposed at different positions from each other in plan view, the air cleaners and the merging chamber are disposed in a planar space to be occupied by the air intake duct, the air outlet of each of the air cleaners extends from a first axial end of the cleaner main body in the axial direction, and the air inlet of each of the air cleaners protrudes from a second axial end of the cleaner main body in the axial direction in a direction orthogonal to the axial direction, and the merging chamber is disposed on the same horizontal plane as the cleaner main bodies.

10. The engine air intake device according to claim 9, wherein the air intake inlet of the air intake duct is provided on an end position of the duct main body, the end portion being disposed above or below the merging chamber.

* * * * *